(12) United States Patent
Yoshida et al.

(10) Patent No.: US 10,277,017 B2
(45) Date of Patent: Apr. 30, 2019

(54) EXTERIOR MEMBER AND WIRE HARNESS

(71) Applicants: Yazaki Corporation, Tokyo (JP); TOYOTA JIDOSHA KABUSHIKI KAISHA, Toyota-shi, Aichi-ken (JP)

(72) Inventors: Hiroyuki Yoshida, Makinohara (JP); Hideomi Adachi, Makinohara (JP); Shinji Oshita, Toyota (JP); Hiroki Kawakami, Okazaki (JP); Kazunori Takata, Toyota (JP); Masatoshi Mizobuchi, Nagoya (JP)

(73) Assignees: YAZAKI CORPORATION, Minato-ku, Tokyo (JP); TOYOTA JIDOSHA KABUSHIKI KAISHA, Aichi-ken (JP)

(*) Notice: Subject to any disclaimer, the term of this patent is extended or adjusted under 35 U.S.C. 154(b) by 0 days.

(21) Appl. No.: 15/902,633

(22) Filed: Feb. 22, 2018

(65) Prior Publication Data

US 2018/0248346 A1    Aug. 30, 2018

(30) Foreign Application Priority Data

Feb. 27, 2017  (JP) .................. 2017-034639

(51) Int. Cl.
| H01B 7/00 | (2006.01) |
| H02G 3/04 | (2006.01) |
| B60R 16/02 | (2006.01) |
| H02G 3/34 | (2006.01) |

(52) U.S. Cl.
CPC ....... *H02G 3/0468* (2013.01); *B60R 16/0215* (2013.01); *H02G 3/34* (2013.01)

(58) Field of Classification Search
USPC ............................................. 174/74 A, 74 R
See application file for complete search history.

(56) References Cited

U.S. PATENT DOCUMENTS

| 2,640,501 A * | 6/1953 | Scott ..................... B21C 37/124 |
| | | 138/130 |
| 4,559,973 A * | 12/1985 | Hane ................... B29C 61/0616 |
| | | 138/138 |
| 6,064,000 A * | 5/2000 | Kim ....................... H01R 4/726 |
| | | 138/138 |

(Continued)

FOREIGN PATENT DOCUMENTS

| JP | 58-157312 A | 9/1983 |
| JP | 2011254614 A | 12/2011 |

(Continued)

OTHER PUBLICATIONS

Communication dated Feb. 5, 2019 from the Japanese Patent Office in counterpart JP application No. 2017-034639.

*Primary Examiner* — William H. Mayo, III
(74) *Attorney, Agent, or Firm* — Sughrue Mion, PLLC

(57) ABSTRACT

An exterior member for a wire harness which is formed in a tube shape so as to accommodate and protect one or a plurality of conduction paths, the exterior member includes an outer layer structure part that has an outer surface and that is an outermost layer, an inner layer structure part that has an inner surface and that is an innermost layer, and an intermediate layer structure part that is one or a plurality of layers between the outer layer structure part and the inner layer structure part.

4 Claims, 6 Drawing Sheets

(56) References Cited

U.S. PATENT DOCUMENTS

| | | | | |
|---|---|---|---|---|
| 8,569,622 | B2* | 10/2013 | Katou | B60R 16/0215 |
| | | | | 138/121 |
| 2009/0107694 | A1* | 4/2009 | Watanabe | H01B 7/16 |
| | | | | 174/102 R |
| 2011/0297415 | A1 | 12/2011 | Katou et al. | |
| 2013/0199656 | A1 | 8/2013 | Sherwin | |
| 2013/0306371 | A1* | 11/2013 | Toyama | B60R 16/0207 |
| | | | | 174/72 A |
| 2015/0114680 | A1* | 4/2015 | Inao | H01B 7/18 |
| | | | | 174/102 R |
| 2015/0136481 | A1* | 5/2015 | Inao | H02G 3/0481 |
| | | | | 174/72 A |
| 2015/0136483 | A1* | 5/2015 | Inao | H01B 7/2825 |
| | | | | 174/72 A |
| 2015/0210230 | A1* | 7/2015 | Adachi | B60R 16/0215 |
| | | | | 174/72 A |
| 2015/0217708 | A1* | 8/2015 | Adachi | H02G 3/0468 |
| | | | | 174/72 A |
| 2015/0237770 | A1* | 8/2015 | Yamasaki | H05K 9/0084 |
| | | | | 174/68.3 |
| 2015/0274095 | A1* | 10/2015 | Inao | B60R 16/0215 |
| | | | | 174/72 A |
| 2015/0294764 | A1* | 10/2015 | Adachi | H02G 3/0468 |
| | | | | 174/113 R |
| 2015/0294765 | A1* | 10/2015 | Katsumata | B32B 1/08 |
| | | | | 174/15.6 |
| 2016/0264074 | A1* | 9/2016 | Oga | H01B 7/04 |
| 2016/0268019 | A1* | 9/2016 | Kanagawa | H02G 3/0468 |

FOREIGN PATENT DOCUMENTS

| | | |
|---|---|---|
| JP | 2015143569 A | 8/2014 |
| JP | 2014-173694 A | 9/2014 |
| JP | 2015-516545 A | 6/2015 |

* cited by examiner

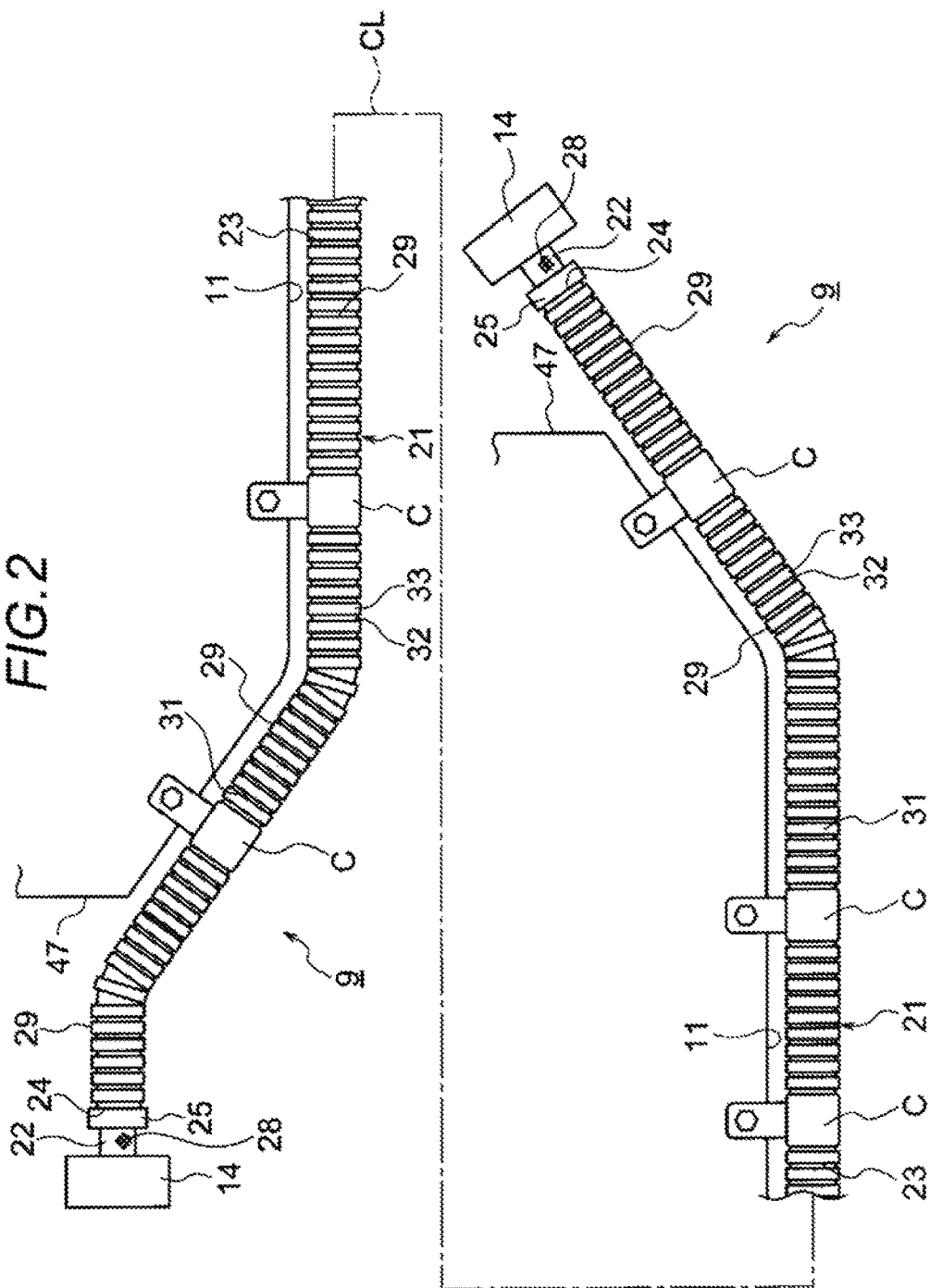

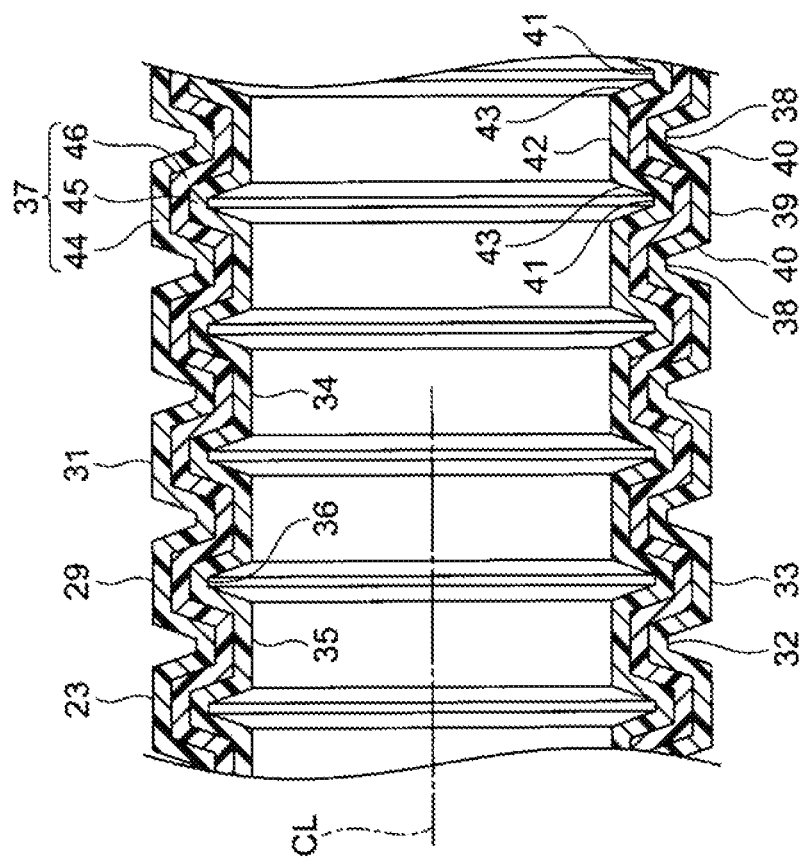
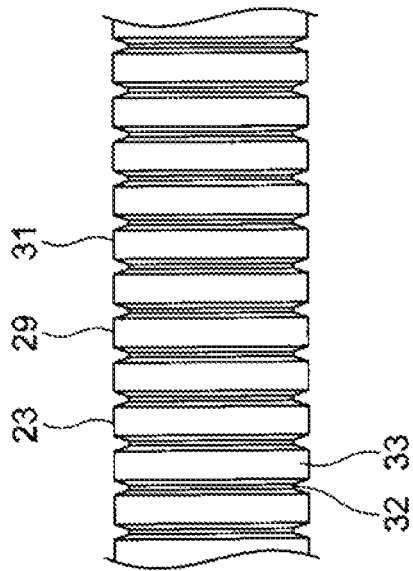

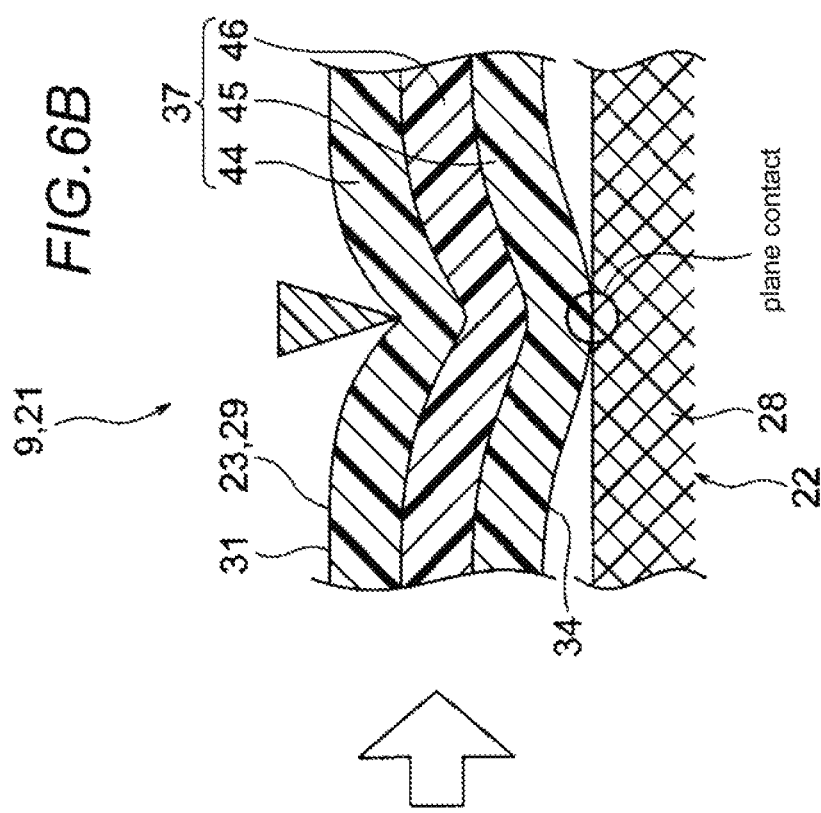
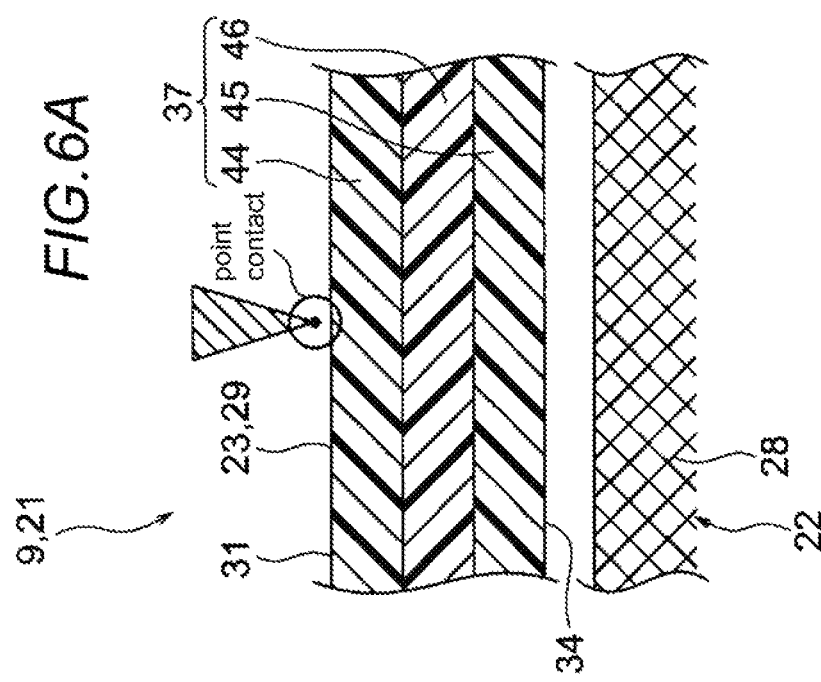

EXTERIOR MEMBER AND WIRE HARNESS

CROSS REFERENCE TO RELATED APPLICATIONS

This application claims priority from Japanese Patent Application No. 2017-034639 filed on Feb. 27, 2017, the entire contents of which are incorporated herein by reference.

BACKGROUND OF THE INVENTION

<Field of the Invention>

The present invention relates to an exterior member for housing and protecting one or a plurality of conduction paths, and a wire harness including the exterior member and conduction paths.

<Description of Related Art>

A wire harness for electrically connecting devices mounted in a vehicle is used. The wire harness includes an exterior member of a tube shape, and one or a plurality of conduction paths accommodated in this exterior member. A corrugated tube adopted as an exterior member constituting the wire harness is known (for instance, see Patent Literature 1: JP-A-2011-254614). The corrugated tube has bellows concave parts and bellows convex parts, and is formed with a flexible tube parts having a shape in which the bellows concave parts and the bellows convex parts are alternately continuous in a direction of a tube axis as a whole. The wire harness including this corrugated tube is produced in a long size. The wire harness is laid to pass below an underfloor of the vehicle.

[Patent Literature 1] JP-A-2011-254614

In the wire harness of the related art, since the wire harness is laid to pass below the floor of the vehicle, for example when the wire harness receives an external force of a steppingstone or the like or when a load greater than or equal to a certain load is intensively applied to the wire harness, there is a fear of a corrugated tube (an exterior member) being damaged. If the damage occurs, the concern is that the damage leads to disconnection of the conduction paths or a fault.

SUMMARY

One or more embodiments provide an exterior member that is hardly damaged, and a wire harness having this exterior member to be able to improve reliability or the like.

In an aspect (1), one or more embodiments provide an exterior member for a wire harness which is formed in a tube shape so as to accommodate and protect one or a plurality of conduction paths. The exterior member includes an outer layer structure part that has an outer surface and that is an outermost layer, an inner layer structure part that has an inner surface and that is an innermost layer, and an intermediate layer structure part that is one or a plurality of layers between the outer layer structure part and the inner layer structure part. The outer layer structure part, the intermediate layer structure part, and the inner layer structure part are closely adherent to each other. The intermediate layer structure part is made of a material softer than those of the outer layer structure part and the inner layer structure part, or the intermediate layer structure part and the inner layer structure part are made of a material softer than that of the outer layer structure part. The exterior member includes at least one pair of neighboring layers in which materials of one layer and the other layer are different in hardness.

In an aspect (2), the exterior member is deformed in a state that deformation of the outer surface and deformation of the inner surface are non-offset due to the intermediate layer structure part, the deformation of the inner surface is smaller than the deformation of the outer surface, and the inner surface is approximately plane contact with the one or a plurality of conduction paths, when an external force is applied to the outer surface at a point or a line.

In an aspect (3), the exterior member is a flexible tube part having flexibility, or a combination of a straight tube part in which the one or a plurality of conduction paths are distributed straight and the flexible tube part.

In an aspect (4), the wire harness includes the exterior member according to any one of aspects (1) to (3) and the one or a plurality of conduction paths accommodated and protected in the exterior member.

According to the aspect (1), since the exterior member for a wire harness is formed in a multi-layered structure, the exterior member can be more hardly damaged than a conventional example. That is, since at least the intermediate layer structure part of the multi-layered structure is formed of a soft material, if a shock or the like is designed to be absorbed by the intermediate layer structure part when an external force acts on the exterior member, the flexible tube parts can be hardly damaged. If at least the intermediate layer structure part is formed of a soft material, the outer layer structure part (and the inner layer structure part) of the multi-layered structure are formed of a material harder than that of the intermediate layer structure part, and thus a function of collision resistance (shock resistance, or strength up) can be held. As a result, the exterior member can be hardly damaged. Therefore, an effect capable of providing the hardly damaged exterior member is exerted.

According to the aspect (1), as the exterior member is formed in the multi-layered structure as described above, the exterior member can be more hardly damaged than the conventional example even without adding a new component. Therefore, the effect capable of providing the hardly damaged exterior member is exerted.

In addition, according to the aspect (1), as the exterior member is formed in the multi-layered structure as described above, a function of, for example, heat dissipation or heat resistance required for the wire harness in addition to the function of the collision resistance can also be held on the outer layer structure part (and the inner layer structure part). Therefore, an effect capable of providing the exterior member that can be used under various environments is exerted.

According to the aspect (2), when an external force acts on the outer surface of the exterior member in the state of the point or the line, the deformation of the outer surface and the deformation of the inner surface are formed in the non-offset state due to the existence of the intermediate layer structure part. Since the deformation of the inner surface is made gentler than the deformation of the outer surface, the inner surface can brought into contact with the conduction paths in the state of the approximate surface. Therefore, an effect capable of relaxing the shock against the conduction paths is exerted, and an effect capable of preventing disconnection or a fault is also exerted.

According to the aspect (3), even either the exterior member whose entirety becomes the flexible tube part or the exterior member in which the flexible tube part and the straight tube part are mixed can be hardly damaged by the multi-layered structure. Therefore, the effect capable of providing the hardly damaged exterior member is exerted.

According to the aspect (4), since the wire harness includes the exterior member according to any one of aspects (1) to (3), an effect capable of providing the wire harness having high reliability or the like is exerted.

BRIEF DESCRIPTION OF THE DRAWINGS

FIGS. 1A and 1B are diagrams illustrating a wire harness of the present invention, wherein FIG. 1A is a schematic diagram illustrating a laid state of a high-voltage wire harness, and FIG. 1B is a schematic diagram illustrating a laid state of a low-voltage wire harness different from the high-voltage wire harness of FIG. 1A;

FIG. 2 is a diagram illustrating a laying path state and a configuration of the wire harness of FIG. 1A;

FIGS. 5A and 5B are views of a flexible tube part in an exterior member, wherein FIG. 5A is an exterior view, and FIG. 5B is a sectional view taken in a direction of a tube axis; and FIGS. 6A and 6B are explanatory views of a case in which an external force acts on an outer surface of the flexible tube part.

DETAILED DESCRIPTION

A wire harness includes an exterior member of a tube shape, and conduction paths that are accommodated and protected in this exterior member. The exterior member has a bendable flexible tube parts, and an outer surface of this flexible tube parts is formed in a shape in which it has bellows concave parts and bellows convex parts. The flexible tube parts includes an outer layer structure part that becomes a part of an outermost layer, an inner layer structure part that becomes a part of an innermost layer, and an intermediate layer structure part that becomes a part of one or a plurality of layers between the outer layer structure part and the inner layer structure part. The exterior member having this multilayered structure is formed in a state in which the layers of the outer layer structure part, the intermediate layer structure part, and the inner layer structure part are brought into close contact. The intermediate layer structure part is formed of a material softer than those of the outer layer structure part and the inner layer structure part. The intermediate layer structure part and the inner layer structure part are formed of a material softer than that of the outer layer structure part. Further, the exterior member has the neighboring layers formed of materials that differ in hardness.

Embodiment

Figure 1A:
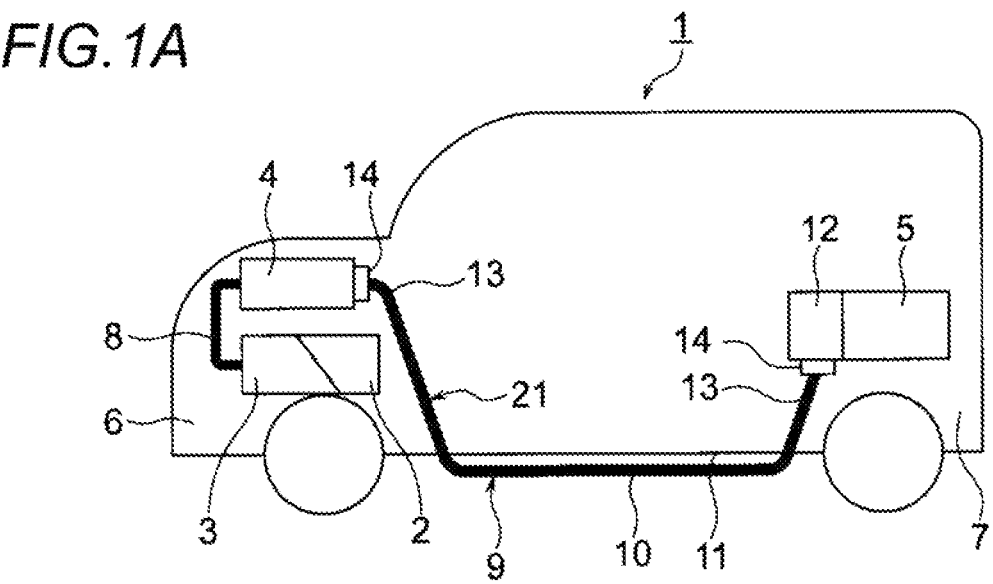
Figure 1B:
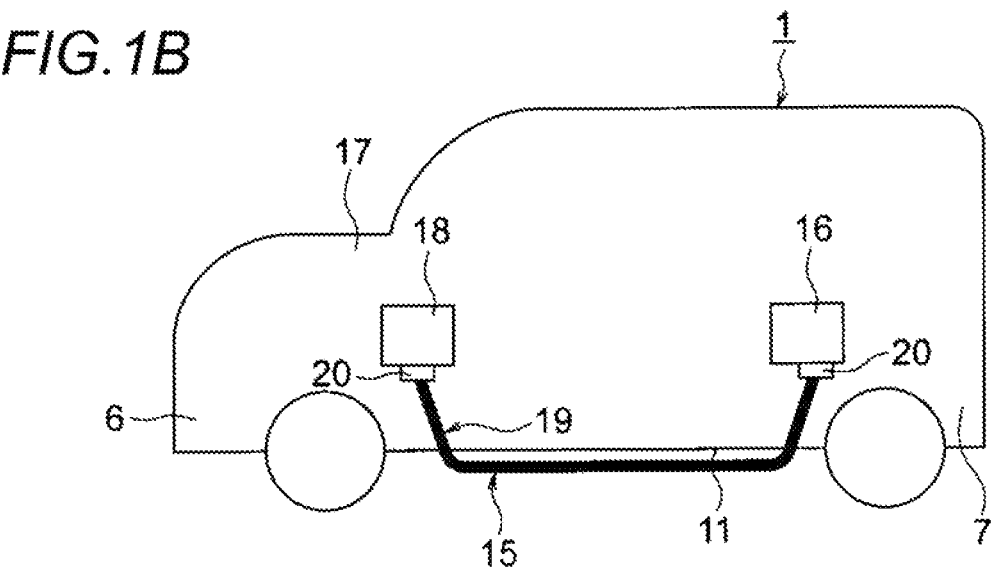
Figure 3:
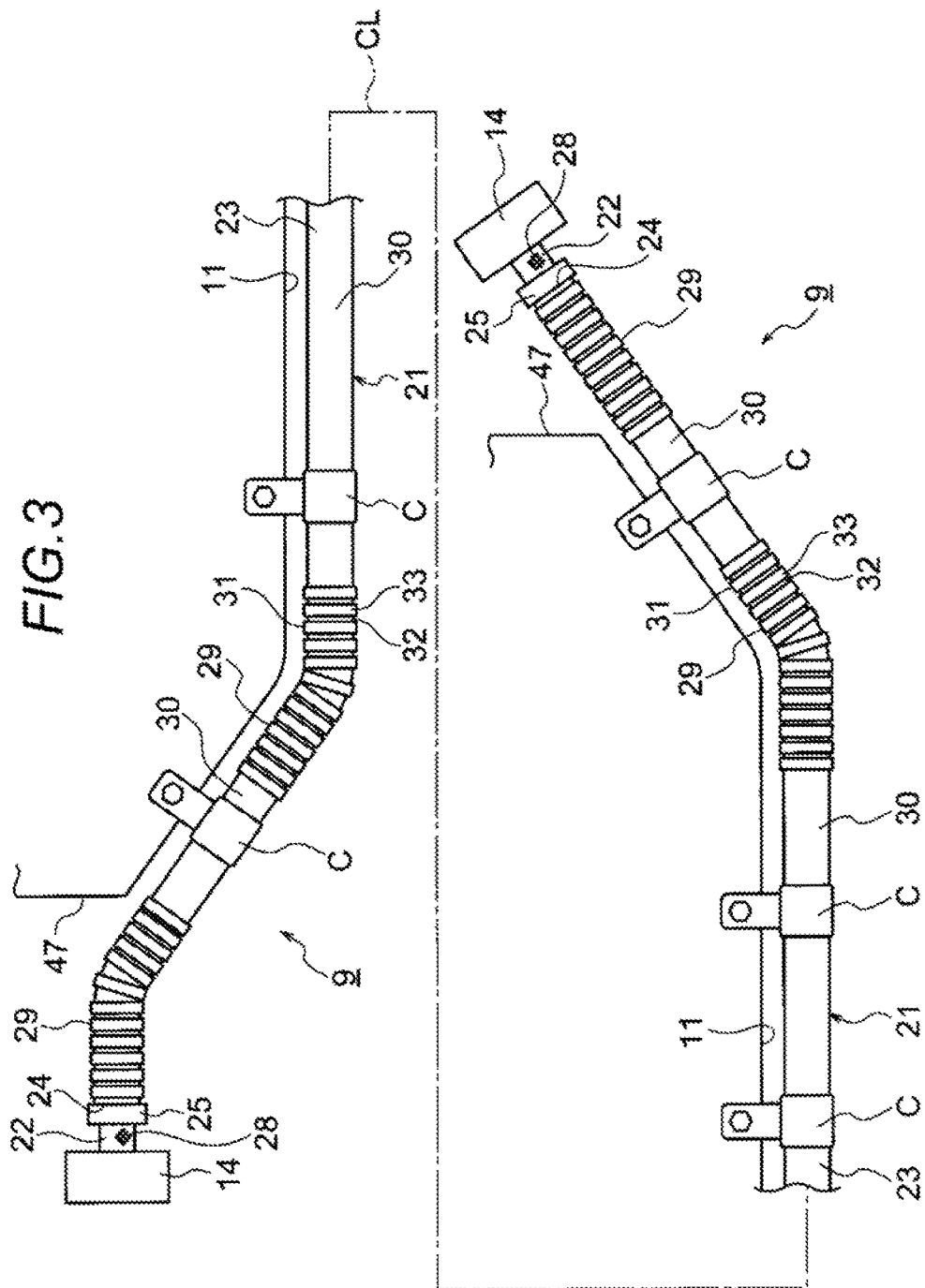
FIG. 3 is a diagram illustrating the laying path state and the configuration of the wire harness of FIG. 1A (wherein an exterior member is a modification of FIG. 2)
Figure 4:
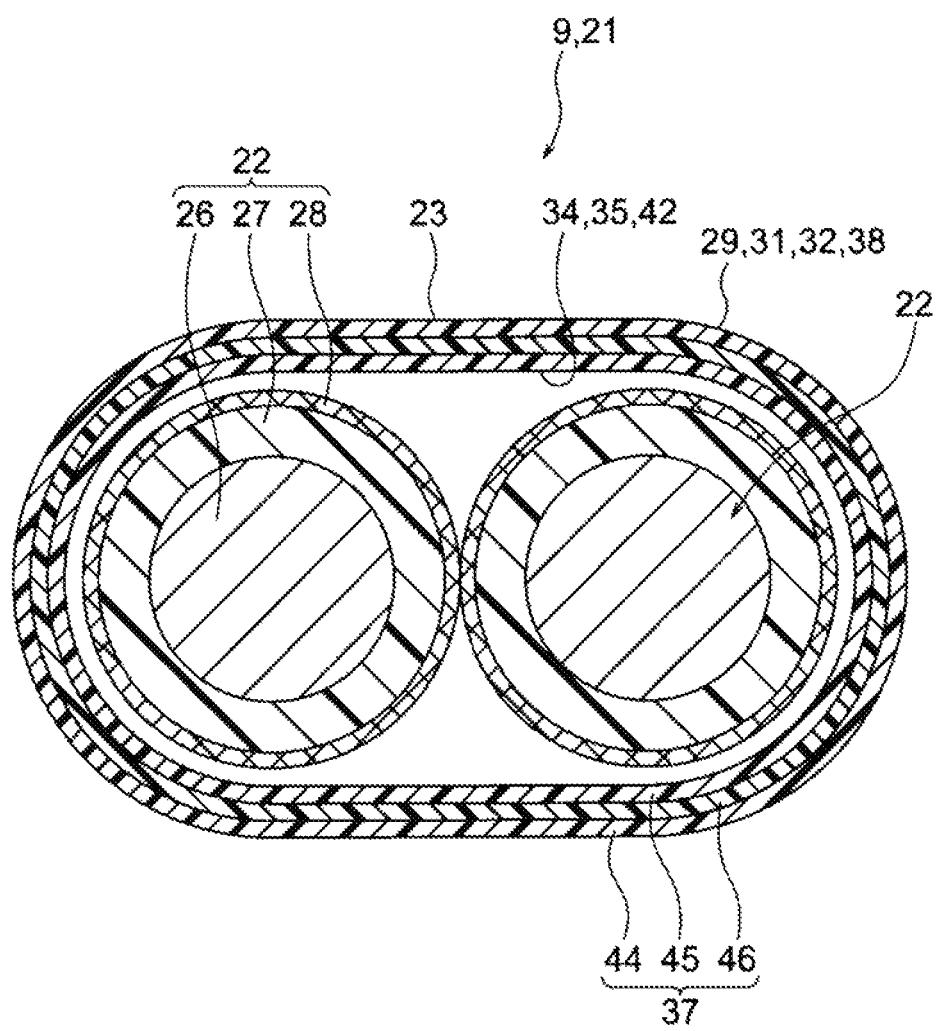
FIG. 4 is a sectional view of the wire harness (taken in a cross section at a position of a bellows concave part of a flexible tube part in the exterior member)

Hereinafter, an embodiment will be described with reference to the drawings. FIGS. 1A and 1B are diagrams illustrating a wire harness of the present invention, wherein FIG. 1A is a schematic diagram illustrating a laid state of a high-voltage wire harness, and FIG. 1B is a schematic diagram illustrating a laid state of a low-voltage wire harness different from the high-voltage wire harness of FIG. 1A. FIGS. 2 and 3 are diagrams illustrating a laying path state and a configuration of the wire harness of FIG. 1A, and FIG. 4 is a sectional view of the wire harness. FIGS. 5A and 5B are views of a flexible tube part in an exterior member, wherein FIG. 5A is an exterior view, and FIG. 5B is a sectional view. FIGS. 6A and 6B are explanatory views of a case in which an external force acts on an outer surface of the flexible tube part.

In the present embodiment, the present invention is adopted for a wire harness that is laid on a hybrid vehicle (may be an electric vehicle or a typical vehicle driven by an engine).

<Configuration of Hybrid Vehicle 1>

In FIG. 1A, a reference sign 1 indicates a hybrid vehicle. The hybrid vehicle 1 is a vehicle that mixes two powers of an engine 2 and a motor unit 3 and is driven by the power. The motor unit 3 is supplied with electric power from a battery (battery pack) 5 via an inverter unit 4. The engine 2, the motor unit 3, and the inverter unit 4 are mounted in an engine room 6 located at a position at which front wheels are present in the present embodiment. The battery 5 is mounted at a vehicle rear portion 7 at which rear wheels are present (may be mounted in a vehicle interior that is present in the rear of the engine room 6).

The motor unit 3 and the inverter unit 4 are connected by a high-voltage wire harness 8 (a motor cable for a high voltage). The battery 5 and the inverter unit 4 are also connected by a high-voltage wire harness 9. An intermediate portion 10 of the wire harness 9 is laid below a vehicle underfloor 11 in a vehicle (a vehicle body). The intermediate portion 10 is laid along the vehicle underfloor 11 nearly in parallel. The vehicle underfloor 11 is a known body (a vehicle body) as well as a so-called panel member, and has a through-hole formed at a predetermined position. The wire harness 9 is water—tightly inserted into the through-hole.

The wire harness 9 and the battery 5 are connected via a junction block 12 provided for the battery 5. External connecting means such as a shield connector 14 set up on a harness terminal 13 close to a rear end of the wire harness 9 is electrically connected to the junction block 12. The wire harness 9 and the inverter unit 4 are electrically connected via external connecting means such as a shield connector 14 set up on a harness terminal 13 close to a front end of the wire harness 9.

The motor unit 3 includes a motor and a generator. The inverter unit 4 includes an inverter and a converter in a configuration thereof. The motor unit 3 is formed as a motor assembly including a shield case. The inverter unit 4 is also formed as an inverter assembly including a shield case. The battery 5 is a Ni-MH based battery or a Li-ion based battery, and is formed by modularization. For example, an electric storage device such as a capacitor can also be used. Naturally, the battery 5 is not particularly limited as long as it can be used in the hybrid vehicle 1 or the electric vehicle.

In FIG. 1B, a reference sign 15 indicates a wire harness. The wire harness 15 is a low-voltage wire harness (a wire harness for a low voltage), and is provided to electrically connect a low-voltage battery 16 of the vehicle rear portion 7 and a supplementary device 18 (a device) mounted at a vehicle front portion 17. Like the wire harness 9 of FIG. 1A, the wire harness 15 is laid through the vehicle underfloor 11 (which is an example, and may be laid through the vehicle interior side). A reference sign 19 in the wire harness 15 indicates a harness body. A reference sign 20 indicates a connector.

As illustrated in FIGS. 1A and 1B, the high-voltage wire harnesses 8 and 9 and the low-voltage wire harness 15 are laid on the hybrid vehicle 1. The present invention can be applied to either wire harness, but it will be described below using the high-voltage wire harness 9 as a representative example. First, a configuration and structure of the wire harness 9 will be described.

Configuration of Wire Harness 9

In FIG. 1A and FIG. 2, the long wire harness 9 laid through the vehicle underfloor 11 includes a harness body 21 and shield connectors 14 (external connecting means) that are set up on opposite terminals (harness terminals 13) of the harness body 21. The wire harness 9 includes clamps C for laying itself at a predetermined position, and water sealing members (for example grommets or the like) (not shown).

Configuration of Harness Body 21

In FIGS. 2 and 4, the harness body 21 includes one long conduction path 22, an exterior member 23 that accommodates and protects the conduction path 22, and caps 25 for an exterior ends which are attached to ends 24 of the exterior member 23 from which the conduction paths 22 are pulled out.

Conduction Path 22

In FIG. 4, the conduction path 22 includes a conductor 26 having a conducting property, an insulator 27 that covers the conductor 26 and has an insulating property, and a braid (a shield member) 28 for exerting a shield function. That is, as the conduction path 22, a path without a sheath is adopted (given by way of example). Since the conduction path 22 has no sheath, it goes without saying that the conduction path 22 is lightweight as much (since the conduction path 22 is long, it goes without saying that the conduction path 22 can be considerably made lightweight compared to a conventional example).

Conductor 26

In FIG. 4, the conductor 26 is formed of copper, a copper alloy, aluminum, or an aluminum alloy in a circular cross-sectional shape. The conductor 26 is either one having a conductor structure formed by stranding strands or one having a rod-shaped conductor structure formed in a circular cross-sectional shape (a round shape) (for example, the rod-shaped conductor structure is conductor structure having a round single core. In this case, the conduction path itself has a rod shape), but either of the two conductors may be used. The insulator 2 formed of an insulating resin material is extruded onto an outer surface of this conductor 26.

Insulator 27

In FIG. 4, the insulator 27 is extruded onto an outer circumferential surface of the conductor 26 using a thermoplastic resin material. The insulator 27 is formed as a sheath having a circular cross-sectional shape. The insulator 27 is formed at a predetermined thickness. As the thermoplastic resin, a variety of known types can be used. For example, the insulator 27 is appropriately selected from polymer materials such as a polyvinyl chloride resin, a polyethylene resin, a polypropylene resin, and so on.

Braid 28

In FIGS. 2 and 4, the braid 28 is provided as an outermost layer of the conduction path 22. This braid 28 is formed in a tubular shape by knitting ultrafine strands having a conducting property. The braid 28 is formed in a shape and size that covers the entire outer circumferential surface thereof from one end to the other end of the insulator 27. Without being limited to the braid 28, a metal foil or the like may be used as a shield member.

Exterior Member 23

In FIGS. 2 to 5B, the exterior member 23 is formed in the shape of one straight tube (which is straight before use) by molding a resin having an insulating property. The exterior member 23 is formed in a shape with no slit (in other words, formed in a slit-free shape (formed in the shape of a non-split tube)). Further, the exterior member 23 is formed in a circular cross-sectional shape according to the shape of the conduction path 22. This exterior member 23 is different from a known exterior member in that it has a multi-layered structure (a multi-layered structure part 37) becoming a characteristic part of the present invention. Hereinafter, the exterior member 23 will be described in a little more specific way by giving two modes by way of example.

In FIGS. 2 and 3, the exterior member 23 is formed in a shown shape having a mode in which the entirety thereof has a flexible tube part 29 (in the case of FIG. 2), or a mode in which the entirety thereof has the flexible tube parts 29 and straight tube parts 30 acting as a part for straightly laying the conduction path 22 (in the case of FIG. 3). In the case of the exterior member 23 of FIG. 3, the plurality of flexible tube parts 29 and the plurality of straight tube parts 30 are formed in a direction of a tube axis CL. In addition, the flexible tube parts 29 and the straight tube parts 30 are formed to be alternately arranged. In the case of FIG. 3, the flexible tube parts 29 are arranged according to a vehicle mounting shape (a shape of a wire harness laid destination, or a shape of a mounting target 47 to be described below). The flexible tube parts 29 are also formed at a length fitted to the shape of the mounting target 47 (are each formed a necessary length according to the shape of the mounting target 47).

When the exterior member 23 has the mode of FIG. 2, the exterior member 23 has the same appearance as a known corrugated tube, but is different from a known exterior member in that it has the flexible tube parts 29, each of which has the structure (the multi-layered structure part 37) as described below.

Flexible Tube Parts 29

In FIG. 4 and FIGS. 5A and 5B, the flexible tube parts 29 are formed at portions at which they can be bent at desired angles in a packaged state of the wire harness 9 or at the time of transportation, furthermore in laying a path on a vehicle. That is, the flexible tube parts 29 are formed at portions at which they can be bent to have a bent shape, and are formed at portions at which they can also naturally return to a straight original state (a state at the time of resin molding).

The flexible tube parts 29 are formed in the shape of a bellows tube as illustrated. That is, each of the flexible tube parts 29 is formed in a shape in which it has bellows concave parts 32 and bellows convex parts 33 in a circumferential direction when viewed from an outer surface 31 thereof. The flexible tube part 29 is formed in a shape in which the bellows concave parts 32 and the bellows convex parts 33 are alternately continuous in the direction of the tube axis CL. Further, the flexible tube part 29 is formed in a shape in which it has inner surface convex parts 35 and inner surface concave parts 36 on an inner surface 34 thereof. Further, the flexible tube part 29 is formed in a shape in which it has the multi-layered structure part 37 becoming a multiple layer when viewed in a cross section thereof.

Bellows Concave Parts 32 and Bellows Convex Parts 33

In FIGS. 5A and 5B, the bellows concave parts 32 and the bellows convex parts 33 are formed in a shape in which a bottom 38 and a top 39 are continuous by a slope 40 when viewed in the direction of the tube axis CL. The bellows concave parts 32 and the bellows convex parts 33 are formed in a shape in which each of the bellows concave parts 32 is located between the neighboring tops 39 (in other words, each of the bellows convex parts 33 is located between the bottoms 38). In the present embodiment, the bellows concave parts 32 and the bellows convex parts 33 are formed to have a dimensional relation in which a width of the top 39 is wider than an interval between the neighboring tops 39.

<Inner Surface Convex Parts 35 and Inner Surface Concave Parts 36>

In FIGS. 5A and 5B, the inner surface convex parts 35 and the inner surface concave parts 36 are formed according to the shapes of the bellows concave parts 32 and the bellows convex parts 33. The inner surface convex parts 35 and the inner surface concave parts 36 are formed in a shape in which a bottom 41 and a top 42 are continuous by a slope 43 when viewed in the direction of the tube axis CL. The inner surface convex parts 35 and the inner surface concave parts 36 are formed in a shape in which each of the inner surface concave parts 36 is located between the neighboring tops 42 (in other words, each of the inner surface convex parts 35 is located between the bottoms 41). A minute curved surface is formed at a portion at which the bottom 41 and the slope 43 are continuous and a portion at which the top 42 and the slope 43 are continuous (it is preferably formed in a shape in which it does not obstruct the insertion of the conduction path 22).

The flexible tube parts 29 are formed such that a thickness from the top 42 of each of the inner surface convex parts 35 to the bottom 38 of each of the bellows concave parts 32 becomes constant. The flexible tube parts 29 are formed such that a thickness from the bottom 41 of each of the inner surface concave parts 36 to the top 39 of each of the bellows convex parts 33 and a thickness from the slope 43 to the slope 40 also become constant.

<Multi-layered Structure Part 37>

In FIG. 4 and FIGS. 5A and 5B, the multi-layered structure part 37 includes the outer layer structure part 44, the inner layer structure part 45, the intermediate layer structure part 46, and is formed as a structure part of three layers such that these structure parts are brought into close contact without a clearance or a distortion of the layer does not occur (the multi-layered structure part 37 is not limited to the three layers. For example, the multi-layered structure part 37 may be a structure part in which the intermediate layer structure part 46 is made up of two layers or three layers and which has four layers or five layers as a whole). This multi-layered structure part 37 is formed at a portion that becomes a thickness of the exterior member 23. The multi-layered structure part 37 of the present embodiment is formed at the same thickness as a known corrugated tube (is not extremely thickened despite the multiple layers, and is also adopted to sufficiently secure flexibility or the like).

<Outer Layer Structure Part 44>

In FIG. 4 and FIGS. 5A and 5B, the outer layer structure part 44 is formed on the outermost layer having the outer surface 31. The outer layer structure part 44 is formed using a material (a hard material) harder than that of the intermediate layer structure part 46. With regard to the material, a material having a function of collision resistance (shock resistance, strength up) is appropriately selected. The material may be a material that can also hold a function of, for example, heat dissipation or heat resistance required for the wire harness 9 in addition to the function of the collision resistance. In the present embodiment, a resin material such as a polypropylene resin (PP) or a polyamide resin (PA) suitable for vehicle components is adopted.

<Inner Layer Structure Part 45>

In FIG. 4 and FIGS. 5A and 5B, the inner layer structure part 45 is formed on the innermost layer having the inner surface 34. Like the outer layer structure part 44, the inner layer structure part 45 44 is formed using a material (a hard material) harder than that of the intermediate layer structure part 46. The material is identical to the above material, and the resin material such as a polypropylene resin (PP) or a polyamide resin (PA) suitable for vehicle components is adopted.

As a combination of the material, the outer layer structure part 44 and the inner layer structure part 45 are together formed of PP. The outer layer structure part 44 is formed of PP, and the inner layer structure part 45 is formed of PA, or the reverse PA and PP are given as an example. In addition, the inner layer structure part 45 may be adopted as follows. That is, the inner layer structure part 45 is not formed using the material (the hard material) harder than that of the intermediate layer structure part 46, and may be formed using a material (a soft material) softer than that of the intermediate layer structure part 46. In this case, it goes without saying that the function of the collision resistance or the like is preferably sufficiently secured by the outer layer structure part 44. The inner layer structure part 45 formed of a soft material is thought that "surface abutting" (to be described below) is relatively facilitated.

<Intermediate Layer Structure Part 46>

In FIG. 4 and FIGS. 5A and 5B, the intermediate layer structure part 46 is formed at a part of one layer (or a plurality of layers) between the outer layer structure part 44 and the inner layer structure part 45. The intermediate layer structure part 46 is be formed using a material softer than those of the outer layer structure part 44 and the inner layer structure part 45. With regard to the material, a material that can hold a function of shock absorption is appropriately selected. In the present embodiment, a soft material such as a polyester-based elastomer, an olefin-based elastomer or a silicone rubber suitable for vehicle components is adopted. If the intermediate layer structure part 46 is used as the part of the plurality of layers, materials differ between the neighboring layers (this is also equally applied to the inner layer structure part 45).

As can be seen from the above, in the multi-layered structure part 37, the intermediate layer structure part 46 is formed using a soft material, and the outer layer structure part 44 and the inner layer structure part 45 are formed using a hard material (the intermediate layer structure part 46 and the inner layer structure part 45 may be formed using a soft material, and the outer layer structure part 44 may be formed using a hard material). Here, if an extreme example is given, it goes without saying that the function of the shock resistance can be more improved at the first and third layers than a conventional example at the time of vehicle collision, and that the function of the shock absorption can be exerted at the second layer. If the function of the heat dissipation or the heat resistance is also held at the first and third layers, it goes without saying that the function is further improved, and that a more flexible approach is possible in various environments of usage.

The thickness of each layer in the multi-layered structure part 37 is appropriately set in consideration of the above functions. In the present embodiment, the thickness of each layer is set such that the "surface abutting" to be described below is possible.

<Operation of Multi-layered Structure Part 37>

In FIG. 6A, the case in which an external force acts on the outer surface 31 of the exterior member 23 in a state of a point (a state of "point abutting." It may be in a state of a line) is considered. If so, deformation of the outer surface 31 and deformation of the inner surface are in a state of non-offset due to existence of the inner layer structure part 46 in the multi-layered structure part 37 as illustrated in FIG. 6B. The deformation of the inner surface 34 becomes gentler than the deformation of the outer surface 31, and thereby the inner surface 34 is also in an approximate surface contactable state with (in a state of the "surface abutting" against) the conduction path 22 (the outermost braid 28). To be specific, the outer layer structure part 44 is deformed. As a result, the intermediate layer structure part 46 is crushed, and a shock (an external force) is absorbed to a certain extent by this crush. The inner layer structure part 45 is formed to be gentler than the outer layer structure part 44, and thereby the deformation of the outer surface 31 and the deformation of the inner surface 34 are made different. As a result, the inner surface 34 is in the state of the "surface abutting" against the conduction path 22. At this time, the damage to the exterior member 23 is not caused, which does not lead to the disconnection or the fault of the conduction path 22.

<Straight Tube Parts 30>

In FIG. 3, the straight tube parts 30 are formed as portions without flexibility like the flexible tube parts 29. The straight tube parts 30 are also formed as unbent portions in a packaged state or at the time of transportation, furthermore in laying a path (the unbent portions refer to portions that do not positively hold the flexibility. The straight tube parts 30 are formed in the shape of a long straight tube. An outer circumferential surface (the outer surface 31) of each of these straight tube parts 30 is formed in an even shape (is adopted as an example).

The straight tube parts 30 are formed at rigid portions compared to the flexible tube parts 29. These straight tube parts 30 are formed at a position and length according to the vehicle mounting shape. Each of the straight tube parts 30 is also formed to have the same multi-layered structure part 37 as each of the flexible tube parts 29. The longest of the plurality of straight tube parts 30 is formed as a part that is arranged on the vehicle underfloor 11 in the present embodiment.

<Caps 25 for Exterior Ends>

In FIGS. 2 and 3, the caps 25 for exterior ends are resin components formed, for example, using a resin material having weather resistance or heat resistance, and are mounted on the conduction path 22 and also the exterior member 23 from which the conduction path 22 is pulled out. Even when for example sands try to enter from the outside to the inside (interior) of the exterior member 23, the caps 25 for exterior ends are formed to be able to impede this.

<Production and Laying Path of Wire Harness 9>

In the above configuration and structure, the wire harness 9 is produced as follows (for example see FIG. 3). That is, the wire harness 9 is produced by inserting the two conduction paths 22 from an opening of one end to an opening of the other end of the exterior member 23 which has the multi-layered structure part 37 and the entirety of which is formed of a resin in an approximately linear shape. The wire harness 9 is produced by blocking the ends 24 of the exterior member 23 having the multi-layered structure part 37 using the caps 25 for exterior ends. Further, the wire harness 9 is produced by mounting clamps C, grommets, boots, etc. at predetermine positions of the outer surface of the exterior member 23 having the multi-layered structure part 37. Furthermore, the wire harness 9 is produced by providing the shield connectors 14 at terminal portions of the conduction paths 22.

After being produced as described above, when the flexible tube parts 29 are bent by folding at the predetermined positions and are held, package of the wire harness 9 is completed. The wire harness 9 of the packaged state is compact, and is transported to a vehicle assembly field in the compact state with no change.

The wire harness 9 is mounted on the mounting target 47 (the structure) of the vehicle from the long part corresponding to the vehicle underfloor 11 in the vehicle assembly field. Since the longest straight tube part 30 of the exterior member 23 is arranged at the long part corresponding to the vehicle underfloor 11, the wire harness 9 is mounted with flexure inhibited. At this time, the wire harness 9 is mounted with excellent workability. After the long part corresponding to the vehicle underfloor is fixed by the clamps C or the like, the remaining parts other than the flexible tube parts 29 in the exterior member 23 are mounted while bending the flexible tube parts 29. When a series of processes according to the mounting are completed, the wire harness 9 is in a state in which it is laid on a desired path.

As described with reference to FIGS. 1A and 1B to FIGS. 6A and 6B, according to the one or more embodiments, since the exterior member 23 for a wire harness is formed in the multi-layered structure (the multi-layered structure part 37), the exterior member 23 can be more hardly damaged than the conventional example. That is, since at least the intermediate layer structure part 46 of the multi-layered structure is formed of a soft material, if a shock or the like is designed to be absorbed by the intermediate layer structure part 46 when an external force acts on the exterior member 23, the flexible tube parts 29 (and the straight tube parts 30) can be hardly damaged. If at least the intermediate layer structure part 46 is formed of a soft material, the outer layer structure part 44 (and the inner layer structure part 45) of the multi-layered structure are formed of a material harder than that of the intermediate layer structure part 46, and thus the function of the collision resistance (the shock resistance, or the strength up) can be held. As a result, the flexible tube parts 29 (and the straight tube parts 30) can be hardly damaged. Therefore, an effect capable of providing the hardly damaged exterior member 23 is exerted.

According to the one or more embodiments, as the exterior member 23 is formed in the multi-layered structure as described above, the exterior member 23 can be more hardly damaged than the conventional example even without adding a new component. Therefore, the effect capable of providing the hardly damaged exterior member 23 is exerted.

In addition, according to the one or more embodiments, as the exterior member 23 is formed in the multi-layered structure as described above, the function of, for example, the heat dissipation or the heat resistance required for the wire harness 9 in addition to the function of the collision resistance can also be held on the outer layer structure part 44 (and the inner layer structure part 45). Therefore, an effect capable of providing the exterior member 23 that can be used under various environments is exerted.

According to the one or more embodiments, when an external force acts on the outer surface 31 of the exterior member 23 in a state of a point or a line, the deformation of the outer surface 31 and the deformation of the inner surface 34 are formed in the non-offset state due to the existence of the intermediate layer structure part 46. Since the deformation of the inner surface 34 is made gentler than the deformation of the outer surface 31, the inner surface 34 can brought into contact with the conduction paths 22 in a state an approximate surface. Therefore, in addition to the above effects, an effect capable of relaxing the shock against the conduction paths is exerted, and an effect capable of preventing the disconnection or the fault is also exerted.

It goes without saying that the present invention can be variously carried out without changing the gist of the present invention.

What is claimed is:

1. An exterior member for a wire harness which is formed in a tube shape so as to accommodate and protect one or a plurality of conduction paths, the exterior member comprising:
   an outer layer structure part that has an outer surface and that is an outermost layer;
   an inner layer structure part that has an inner surface and that is an innermost layer; and
   an intermediate layer structure part that is one or a plurality of layers between the outer layer structure part and the inner layer structure part,
   wherein the outer layer structure part, the intermediate layer structure part, and the inner layer structure part are closely adherent to each other,
   wherein the intermediate layer structure part is made of a material softer than those of the outer layer structure part and the inner layer structure part, or the intermediate layer structure part and the inner layer structure part are made of a material softer than that of the outer layer structure part,
   wherein the exterior member includes at least one pair of neighboring layers in which materials of one layer and the other layer are different in hardness, and
   wherein the exterior member is deformed in a state that deformation of the outer surface and deformation of the inner surface are non-offset due to the intermediate layer structure part.

2. The exterior member according to claim 1, wherein the deformation of the inner surface is smaller than the deformation of the outer surface and the inner surface is approximately plane contact with the one or a plurality of conduction paths, when an external force is applied to the outer surface at a point or a line.

3. The exterior member according to claim 1, wherein the exterior member is a flexible tube part having flexibility, or a combination of a straight tube part in which the one or a plurality of conduction paths are distributed straight and the flexible tube part.

4. The wire harness comprising:
   the exterior member according to claim 1; and
   the one or a plurality of conduction paths accommodated and protected in the exterior member.

* * * * *